US011858310B2

(12) United States Patent
Yasunaga et al.

(10) Patent No.: US 11,858,310 B2
(45) Date of Patent: Jan. 2, 2024

(54) AIR CONDITIONER FOR VEHICLE

(71) Applicant: DENSO CORPORATION, Kariya (JP)

(72) Inventors: Masao Yasunaga, Kariya (JP); Toshikazu Matsuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 17/394,514

(22) Filed: Aug. 5, 2021

(65) Prior Publication Data

US 2021/0362560 A1 Nov. 25, 2021

Related U.S. Application Data

(63) Continuation of application No. PCT/JP2019/050530, filed on Dec. 24, 2019.

(30) Foreign Application Priority Data

Feb. 13, 2019 (JP) ................................ 2019-023695

(51) Int. Cl.
 *B60H 1/00* (2006.01)
(52) U.S. Cl.
 CPC ..... *B60H 1/00521* (2013.01); *B60H 1/00064* (2013.01); *B60H 2001/00092* (2013.01)
(58) Field of Classification Search
 CPC ............ B60H 1/00521; B60H 1/00064; B60H 2001/00092; B60H 2001/006
 See application file for complete search history.

(56) References Cited

U.S. PATENT DOCUMENTS

2012/0132396 A1* 5/2012 Komatsubara ..... B60H 1/00521
165/67

FOREIGN PATENT DOCUMENTS

| JP | 2006273148 A | | 10/2006 |
| JP | 2008018905 A | * | 1/2008 |
| JP | 2015075252 A | | 4/2015 |

* cited by examiner

*Primary Examiner* — Marc E Norman
(74) *Attorney, Agent, or Firm* — Harness, Dickey & Pierce, P.L.C.

(57) ABSTRACT

An air conditioner for a vehicle includes: a case having an air passage; a heat exchanger having a core portion in which heat is exchanged between air and a heat medium; a support portion provided in the case to support a lower portion of the heat exchanger; and a cushioning material interposed between the lower portion of the heat exchanger and the support portion. The lower portion of the heat exchanger has a pipe side adjacent to an inflow pipe or an outflow pipe for the heat medium and an opposite-to-pipe side located on an opposite side of the pipe side. The support portion includes a pipe side support that supports the pipe side, and an opposite-to-pipe side support that supports the opposite-to-pipe side. A surface area of the opposite-to-pipe side support in contact with the cushioning material is larger than that of the pipe side support.

4 Claims, 5 Drawing Sheets

AIR CONDITIONER FOR VEHICLE

CROSS REFERENCE TO RELATED APPLICATIONS

The present application is a continuation application of International Patent Application No. PCT/JP2019/050530 filed on Dec. 24, 2019, which designated the U.S. and claims the benefit of priority from Japanese Patent Application No. 2019-023695 filed on Feb. 13, 2019. The entire disclosures of all of the above applications are incorporated herein by reference.

TECHNICAL FIELD

The disclosure relates to an air conditioner for a vehicle.

BACKGROUND

Vibration propagation from an evaporator to a housing is suppressed by a packing disposed between a lower end surface of the evaporator and the housing in a refrigeration cycle apparatus.

SUMMARY

An air conditioner for a vehicle includes: a case having an air passage through which air flows into a cabin; a heat exchanger having a core portion in which heat is exchanged between the air and a heat medium flowing inside, the core portion being arranged so as to cross the air passage; a support portion provided in the case to support a lower portion of the heat exchanger; and a cushioning material interposed between the lower portion of the heat exchanger and the support portion. The lower portion of the heat exchanger has a pipe side adjacent to an inflow pipe or an outflow pipe for the heat medium and an opposite-to-pipe side located on an opposite side of the pipe side. The support portion includes a pipe side support that supports the pipe side, and an opposite-to-pipe side support that supports the opposite-to-pipe side. A surface area of the opposite-to-pipe side support in contact with the cushioning material is larger than that of the pipe side support.

DESCRIPTION OF EMBODIMENT

Figure 1:
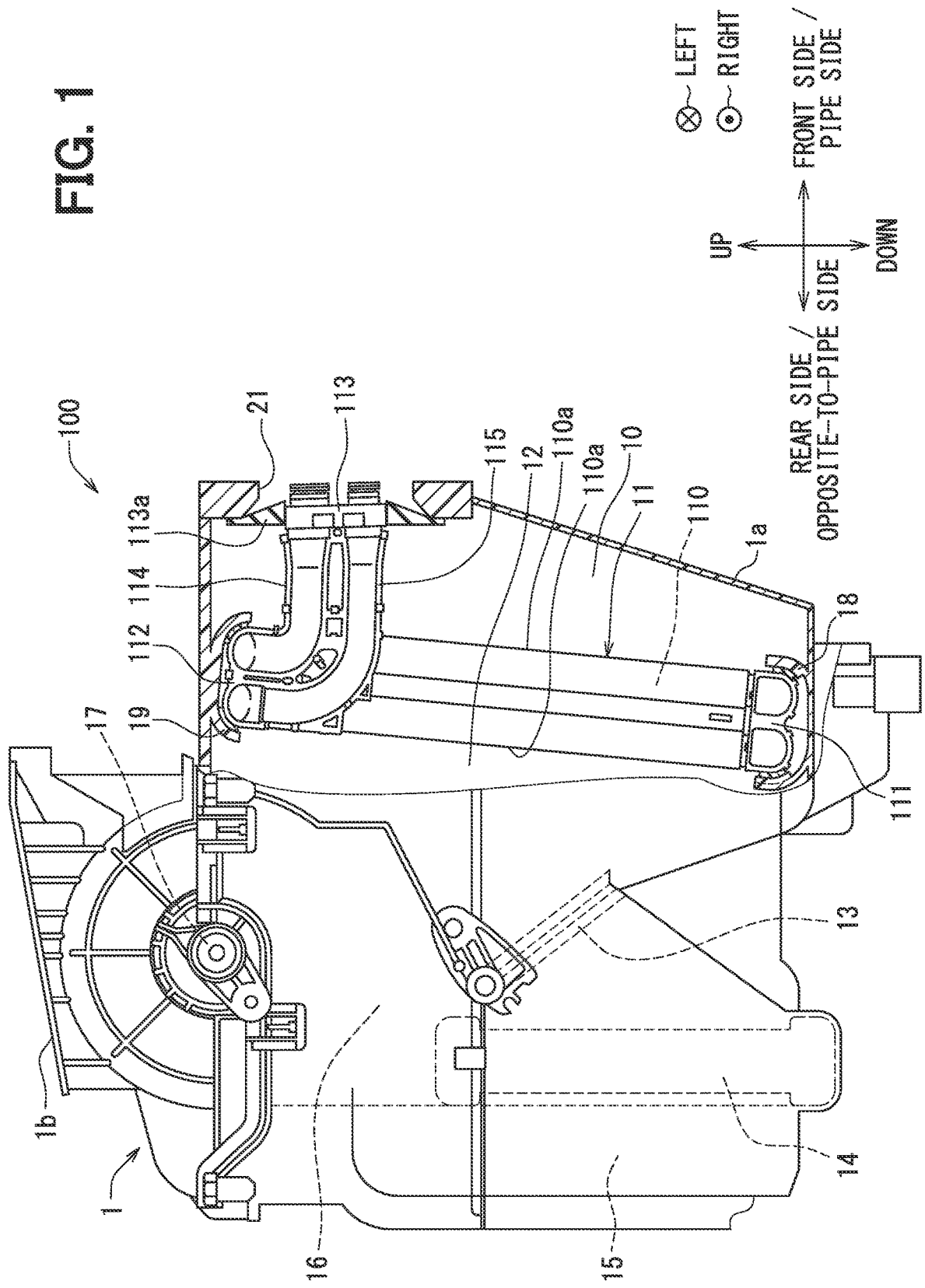
FIG. 1 is a diagram showing an air conditioner according to a first embodiment in which an evaporator is disposed in a case.

To begin with, examples of relevant techniques will be described.

In order to suppress vibration propagation from an evaporator of a refrigeration cycle apparatus to a housing, a packing is interposed between a lower end surface of the evaporator and the housing.

An air conditioner for a vehicle includes a heat exchanger held in a case. Vibration is propagated through a pipe to the heat exchanger, for example, due to a flow of working fluid. The vibration propagated to the heat exchanger is transmitted to the case and causes abnormal sound and noise. For example, in a vehicle traveling by motor power or a vehicle in which an engine is stopped, the background noise is low. Therefore, during the air conditioning operation of the air conditioner, noise is likely to be generated from the heat exchanger as a vibration source.

The present disclosure provides an air conditioner capable of reducing vibration transmitted from a heat exchanger to a case of the air conditioner.

According to one aspect, an air conditioner for a vehicle includes: a case having an air passage through which air flows into a cabin; a heat exchanger having a core portion in which heat is exchanged between the air and a heat medium flowing inside, the core portion being arranged so as to cross the air passage; a support portion provided in the case to support a lower portion of the heat exchanger; and a cushioning material interposed between the lower portion of the heat exchanger and the support portion. The lower portion of the heat exchanger has a pipe side adjacent to an inflow pipe or an outflow pipe for the heat medium and an opposite-to-pipe side located on an opposite side of the pipe side. The support portion includes a pipe side support that supports the pipe side, and an opposite-to-pipe side support that supports the opposite-to-pipe side. A surface area of the opposite-to-pipe side support in contact with the cushioning material is larger than that of the pipe side support.

The support portion has the pipe side support that supports the pipe side of the lower portion of the heat exchanger located adjacent to the inflow pipe or the outflow pipe for the heat medium. The support portion has the opposite-to-pipe side support that supports the opposite-to-pipe side located on the opposite side of the pipe side in the lower portion of the heat exchanger. The surface area of the opposite-to-pipe side support in contact with the cushioning material is larger than that of the pipe side support.

According to the air conditioner, the surface area of the opposite-to-pipe side support in contact with the cushioning material is larger than the surface area of the pipe side support in contact with the cushioning material. With this configuration, the pressure given to the cushioning material by the opposite-to-pipe side support can be made smaller than the pressure given to the cushioning material by the pipe side support. As a result, the amount of deformation of the cushioning material on the opposite-to-pipe side can be made smaller than that of the cushioning material on the pipe side. Thus, the cushioning material on the opposite-to-pipe side is more easily deformed elastically and exhibits the ability to absorb the vibration of the heat exchanger. Due to this, when the heat exchanger is pulled by the pipe and tilts toward the pipe, the cushioning material on the opposite-to-pipe side is deformed more than the cushioning material on the pipe side, and the vibration of the heat exchanger is restricted from transmitting to the opposite-to-pipe side. Thus, it is possible to provide an air conditioner capable of reducing vibration transmitted from the heat exchanger to the case of the air conditioner.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of the configuration is described in each form, the other forms described above can be applied to the other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

An air conditioner 100 of the first embodiment, which is an example of air conditioner for a vehicle, will be described with reference to FIGS. 1 to 5. As shown in FIG. 1, the air conditioner 100 includes a case 1 that forms an air passage inside and houses various functional parts. The case 1 is formed by combining case members. The case 1 is formed, for example, by connecting at least a first case member 1a and a second case member 1b at a fitting portion in the vertical direction. The first case member 1a is arranged below the second case member 1b. The second case member 1b is arranged on the upper side of the first case member 1a.

The first case member 1a and the second case member 1b form the fitting portion extending in the left-right direction and the front-rear direction of the vehicle. The fitting portion includes, for example, a protrusion formed on a joint end of one of the case members and a groove formed on a joint end of the other case member.

The air conditioner 100 is installed, for example, behind a dash panel, which is a partition plate separating the engine room from the cabin, at the front portion of the cabin. The air conditioner 100 has two parts, i.e., a blower unit and an air conditioning unit arranged side by side in the left and right direction.

The blower unit sucks air in or out of the cabin into the case 1, and has an inside/outside air switching box at the top. The blower unit is equipped with an electric blower having a centrifugal multi-blade fan and a motor for driving the fan. The centrifugal multi-blade fan is located inside the scroll casing. On the downstream side of the scroll casing in the air flow, a duct portion is provided to form a flow path extending from the outlet of the scroll casing. The duct portion forms an air passage 10 for introducing air from the blower into the evaporator 11, and the air flows into the cabin. The outlet of the blower unit is connected to the inlet of the air conditioning unit by the duct portion.

The air conditioning unit includes a heat exchanger such as an evaporator 11 and a heater core 14, an air mix door 13, and an air outlet switching door, inside the case 1. The case 1 is formed of case members made of resin molded product having a certain degree of elasticity and excellent strength, such as polypropylene. The case members are assembled after the heat exchanger such as the evaporator 11 and the heater core 14 are housed at a predetermined position, to integrally form the case 1 by engaging parts such as snap fit, metal spring clips, fastening parts such as screws, and the like.

The case 1 is integrally molded together with the scroll casing and the duct portion. A part of the scroll casing and the duct portion on the upper side is integrally molded by the second case member 1b, and the rest of the scroll casing and the duct portion on the lower side are integrally molded by the first case member 1a. The case 1 houses an inflow pipe 114 extending from the evaporator 11, an outflow pipe 115 extending from the evaporator 11, and a pipe connection portion 113, in addition to the evaporator 11.

The inflow pipe 114, the outflow pipe 115, and the pipe connection portion 113 face an pipe opening 21 provided in the case 1. The pipe opening 21 is a through hole that penetrates the case 1 in the front-rear direction of the vehicle. The pipe opening 21 is larger than the outer shape of the pipe connection portion 113. When the pipe opening 21 is viewed in the rear side with the evaporator 11 housed in the case 1, at least a part of the inflow pipe 114, the outflow pipe 115, and the pipe connection portion 113 can be visually observed through the pipe opening 21.

A seal member 113a is provided on the outer periphery of the pipe connection portion 113 and is elastically deformable. The seal member 113a comes into contact with the inner surface of the first case member 1a. The seal member 113a is formed of, for example, an elastomer such as natural rubber, synthetic rubber, or urethane. The seal member 113a is in contact with the inner surface of the case 1, for example, at or near the inner peripheral edge of the pipe opening 21 with the evaporator 11 housed in the case 1. When the seal member 113a comes into contact with the inner surface of the case 1 in the elastically deformed state, it is possible to restrict the air flowing down the air passage 10 from leaking out of the case 1 from the periphery of the pipe connection portion 113.

The heat exchanger such as the evaporator 11 is held in the case 1. The heat exchanger vibrates due to the flow of working fluid inside. Such vibration is also called a fluid passing sound. The vibration propagated to the heat exchanger is transmitted to the case 1 that supports the heat exchanger, and causes abnormal sound and noise. The air conditioner 100 includes a support structure for supporting the case 1 in order to suppress vibration propagation from the evaporator 11.

The lower tank 111 of the evaporator 11, through which air does not pass, is located below the heat exchange core portion 110. The lower tank 111 is supported by a support portion 18 provided on the first case member 1a. A cushioning material 20 is interposed between the support portion 18 and the lower tank 111. The cushioning material 20 is made of an easily deformable material, an elastic material, or a material having resilience. The cushioning material 20 may be made of urethane rubber, elastomer, silicone-based material, natural rubber, synthetic rubber and the like. The cushioning material 20 seals gap between the lower tank 111 of the evaporator 11 and the inner wall of the case 1 so that air does not leak. The cushioning material 20 has a band shape with dimensions over the entire lower tank 111 in a direction orthogonal to the flow direction of air. The cushioning material 20 is provided at a position so as to come into contact with the lower tank 111.

The upper tank 112 of the evaporator 11, through which air does not pass, is located above the heat exchange core portion 110. The upper tank 112 is supported by a support portion 19 provided on the second case member 1b. A cushioning material may also be interposed between the support portion 19 and the upper tank 112. The evaporator 11 is installed inside the case 1 so as to be interposed between the second case member 1b and the first case member 1a respectively from the upper side and the lower side. The case 1 is formed by assembling the second case member 1b to the first case member 1a so as to form the fitting portion.

A piping such as the inflow pipe 114 and the outflow pipe 115 is connected to the heat exchanger such as the evaporator 11 directly or indirectly. The heat exchanger is pulled by the piping in the extending direction of the piping. Therefore, the heat exchanger tends to be in an inclined posture so that a side of the heat exchanger near the piping is closer to the piping than the far side of the heat exchanger away from the piping is. For example, as shown in FIGS. 1 and 2, the evaporator 11 tends to tilt so that the upper part of the evaporator 11 is closer to the piping than the lower part of the evaporator 11 is.

Due to such a positioning of the evaporator 11, the lower tank 111 is tilted so that the opposite-to-pipe side 111b is closer to the support portion 18 than the pipe side 111a located adjacent to the piping. The pipe side 111a corresponds to a side surface of the lower tank 111 adjacent to the piping, and extends upward with respect to a lower surface of the lower tank 111. The side surface adjacent to the piping has the same length as the lower surface of the lower tank 111 in a direction orthogonal to the flow direction of air. The side surface adjacent to the piping is inclined so that the upper part is located adjacent to the piping than the lower part is. The opposite-to-pipe side 111b corresponds to a side surface of the lower tank 111 on the opposite-to-pipe side located away from the piping, and extends upward with respect to the lower surface of the lower tank 111. The side surface on the opposite side of the piping has the same length as the lower surface of the lower tank 111 in a direction orthogonal to the flow direction of air. The side surface on the opposite side of the piping is inclined so that the upper part is located adjacent to the piping than the lower part is.

Figure 2:
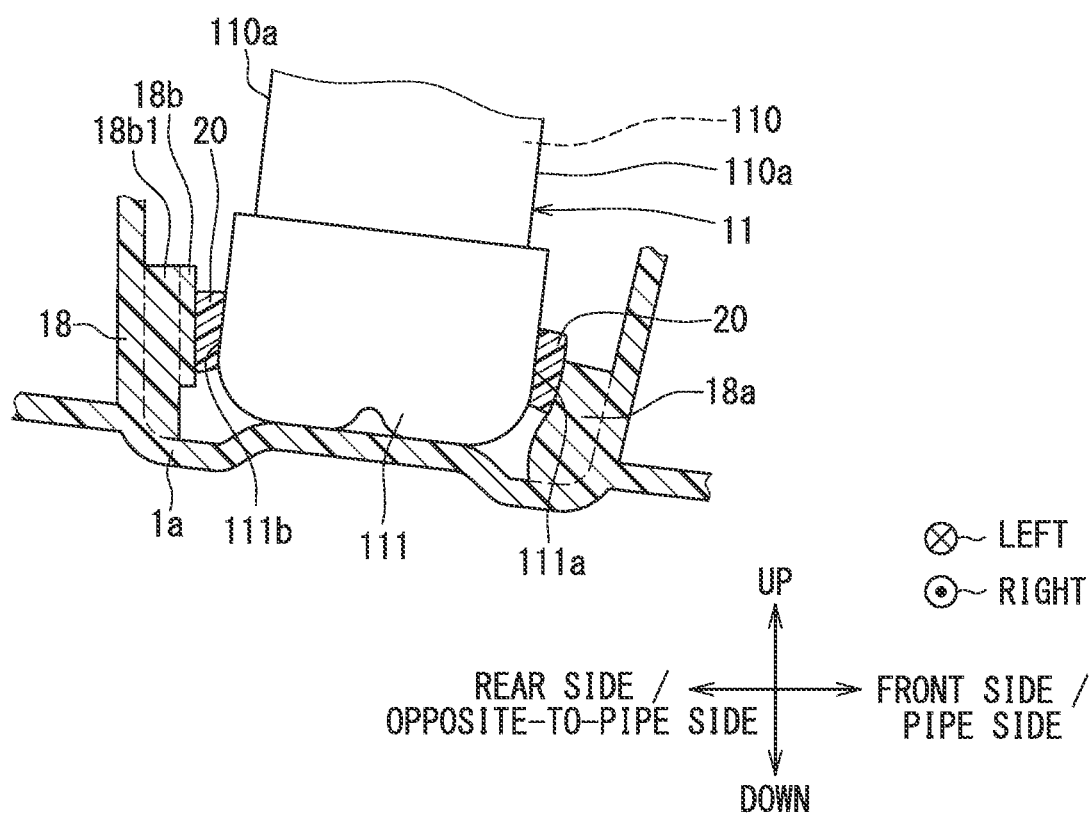
FIG. 2 is a cross-sectional view showing a part of the case that supports a lower tank of the evaporator in the first embodiment.

As shown in FIG. 2, the support portion 18 includes a pipe side support 18a and an opposite-to-pipe side support 18b. The pipe side support 18a supports the pipe side 111a of the lower tank 111 located adjacent to the piping for the heat medium. The cushioning material 20 is interposed between the pipe side 111a of the lower tank 111 and the pipe side support 18a to seal the gap. The opposite-to-pipe side support 18b supports the opposite-to-pipe side 111b of the lower tank 111 on the side opposite to the pipe side 111a. The cushioning material 20 is interposed between the opposite-to-pipe side 111b of the lower tank 111 and the opposite-to-pipe side support 18b to seal the gap.

The surface area of the opposite-to-pipe side support 18b that contacts the cushioning material 20 is larger than the surface area of the pipe side support 18a that contacts the cushioning material 20. The opposite-to-pipe side support 18b has a support surface that comes into contact with the cushioning material 20. The support surface of the opposite-to-pipe side support 18b is larger than the surface area of the pipe side support 18a that comes into contact with the cushioning material 20. As a result, the pressure given to the cushioning material 20 by the opposite-to-pipe side support 18b is smaller than the pressure given to the cushioning material 20 by the pipe side support 18a. The opposite-to-pipe side support 18b is a support pressure suppressing portion capable of suppressing the support pressure for supporting the cushioning material 20.

The pipe side support 18a has a pipe side rib that projects inward from the case 1. The pipe side support 18a has a plate shape projected from the inner wall surface of the case 1. The pipe side support 18a comes into contact with the cushioning material 20 at the tip end surface of the plate shape.

The opposite-to-pipe side support 18b is integrally provided with an opposite-to-pipe side rib 18b1 protruding from the case 1, and has the support surface intersecting with the opposite-to-pipe side rib 18b1. The opposite-to-pipe side rib 18b1 has a plate-shape that protrudes from the inner wall surface of the case 1. The surface area of the support surface of the opposite-to-pipe side support 18b is larger than a cross-sectional area of a joint portion where the opposite-to-pipe side support 18b is joined on the opposite-to-pipe side rib 18b1. Since the pipe side support 18a provides a support pressure to the cushioning material 20 within a relatively small area, the supported portion of the cushioning material 20 supported by the pipe side support 18a is greatly deformed and becomes hard, such that the elasticity is reduced. On the other hand, the opposite-to-pipe side support 18b provides a support pressure to the cushioning material 20 within a relatively large area. Therefore, the supported portion of the cushioning material 20 supported by the opposite-to-pipe side support 18b has a smaller amount of deformation than that supported by the pipe side support 18a. The supported portion of the cushioning material 20 supported by the opposite-to-pipe side support 18b can be more deformable and has elasticity.

The opposite-to-pipe side support 18b may be coupled to the opposite-to-pipe side rib 18b1 at one end or a central portion of the opposite-to-pipe side support 18b.

The opposite-to-pipe side support 18b has a plate shape extending and projecting from the end of the opposite-to-pipe side rib 18b1 to both sides. The opposite-to-pipe side support 18b and the opposite-to-pipe side rib 18b1 have a T-shaped cross-section. Therefore, when an external force acts on the support surface of the opposite-to-pipe side support 18b, the opposite-to-pipe side support 18b is easily deformed so that both side portions of the opposite-to-pipe side support 18b are bent with respect to the central portion. When an external force acts intermittently on the opposite-to-pipe side support 18b due to the vibration of the evaporator 11, the opposite-to-pipe side support 18b can swing with a fulcrum that is a joint portion with the opposite-to-pipe side rib 18b1. The opposite-to-pipe side support 18b has elasticity to be deformed by an external force.

The support surface of the opposite-to-pipe side support 18b has a rectangular shape. As shown in FIG. 2, the cushioning material 20 located on the opposite-to-pipe side is in contact with a part of the support surface of the opposite-to-pipe side support 18b. The opposite-to-pipe side support 18b has a surface area larger than the contact area in contact with the cushioning material 20. As a result, the support surface of the opposite-to-pipe side support 18b can support the entire range of the cushioning material 20 on the opposite-to-pipe side in the direction orthogonal to the flow direction of air, i.e., in the left-right direction shown in FIG. 2.

Figure 3:
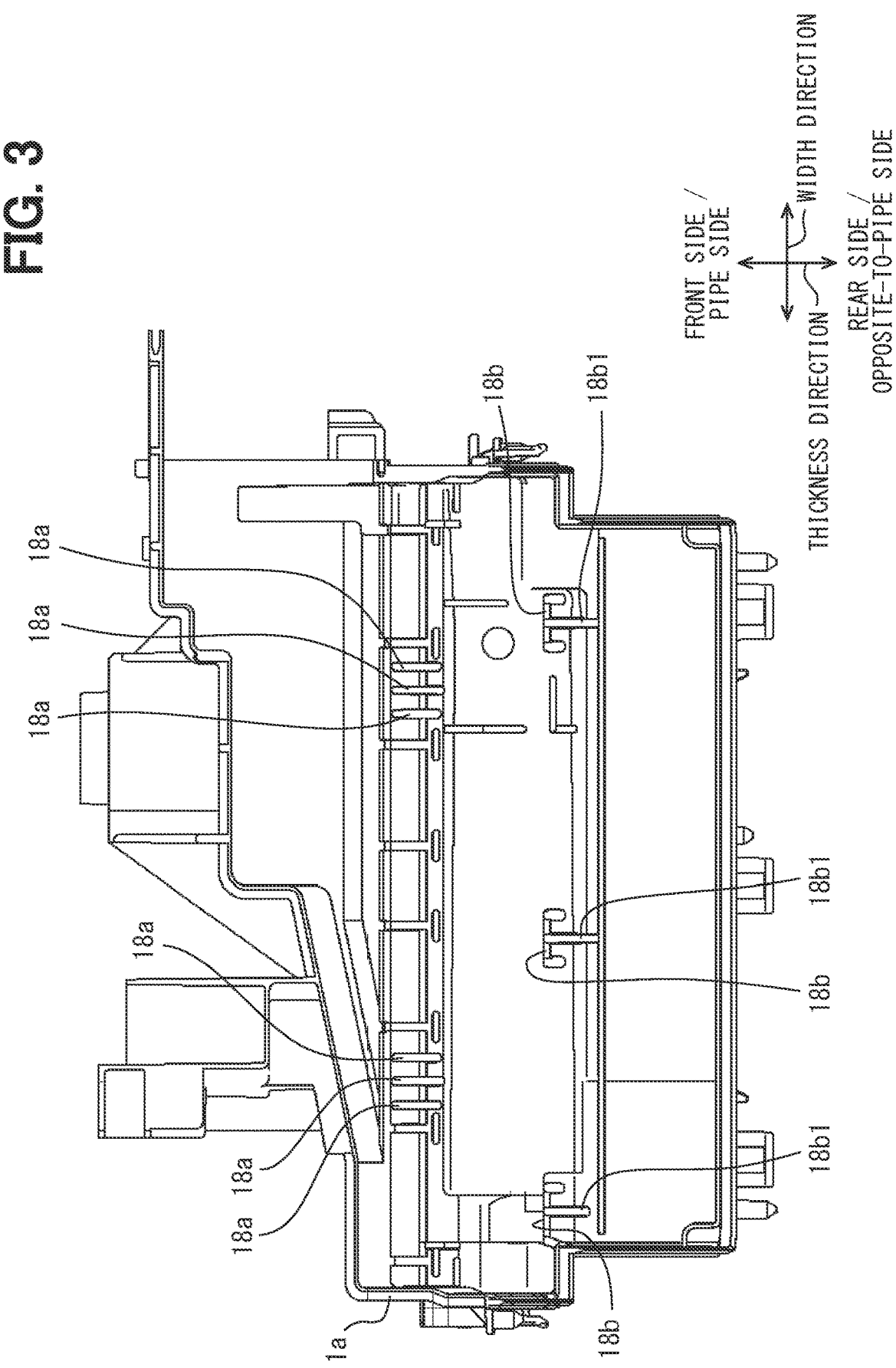
FIG. 3 is a plan view showing a support portion of the case that supports the lower tank of the evaporator.

FIG. 3 shows the inside of the first case member 1a of the case 1. As shown in FIG. 3, the case 1 has the plural pipe side supports 18a arranged at intervals along the side surface of the lower tank 111 of the evaporator 11 adjacent to the piping. The case 1 has a predetermined number of pipe side supports 18a arranged at intervals in the direction orthogonal to the flow direction of air.

The case 1 has the plural opposite-to-pipe side supports 18b arranged at intervals along the side surface of the lower tank 111 of the evaporator 11 on the opposite-to-pipe side. The opposite-to-pipe side support 18b is provided at a position not to oppose the pipe side supports 18a in the flow direction of air. In other words, the pipe side support 18a and the opposite-to-pipe side support 18b are provided at positions not overlapping each other in the arrangement direction of the pipe side supports 18a and the opposite-to-pipe side supports 18b.

Figure 4:
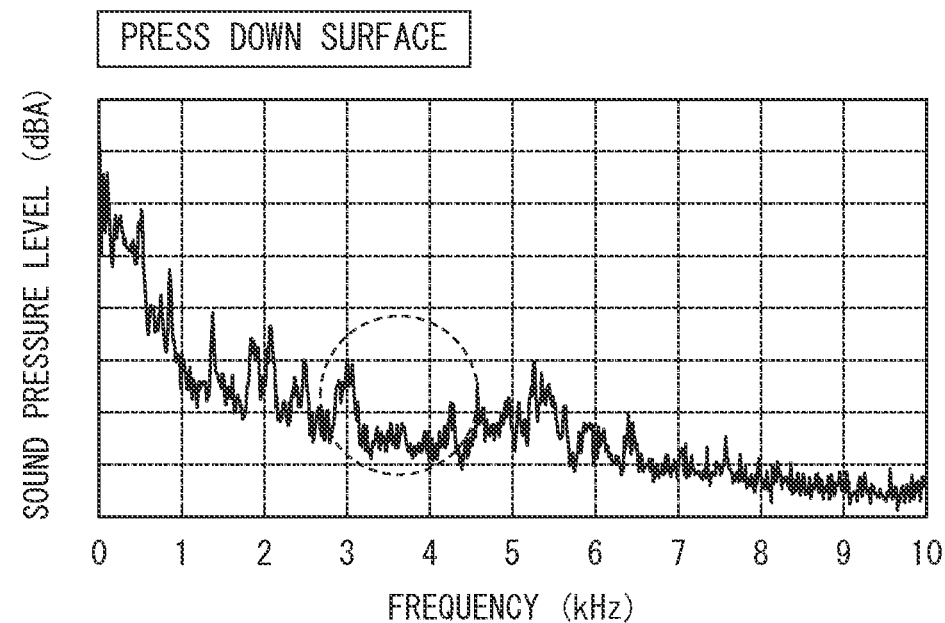
FIG. 4 is frequency analysis graph showing a noise level measured for the air conditioner of the first embodiment.
Figure 5:
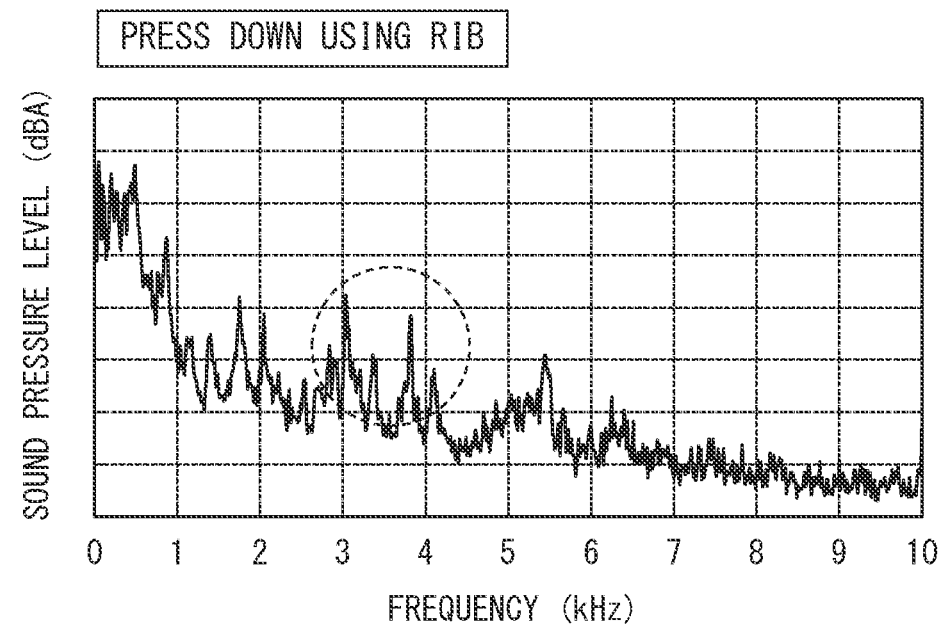
FIG. 5 is frequency analysis graph showing a noise level measured for an air conditioner of a comparative example.

FIG. 4 shows a noise level measured for the air conditioner 100 of the first embodiment. FIG. 5 shows a noise level measured for an air conditioner of a comparative example. The air conditioner of the comparative example does not have the opposite-to-pipe side support 18b with respect to the air conditioner 100 of the first embodiment, and the opposite-to-pipe side is provided with the same rib as the pipe side support 18a. That is, the air conditioner of the comparative example has the lower tank 111 of the evaporator 11 supported by the ribs both on the pipe side and the opposite-to-pipe side.

As shown in FIG. 4 and FIG. 5, the peak value of the sound pressure level is higher in the comparative example than the first embodiment at a specific frequency band corresponding to an area surrounded by a broken line circle. As described above, according to the air conditioner 100, the vibration propagation to the case 1 can be suppressed by the vibration absorption effect of the opposite-to-pipe side support 18b.

Other configurations of the air conditioner 100 will be described. The air passage 10 extending in the width direction of the vehicle is provided in the front portion of the case 1. Air flows from the blower toward the evaporator 11 in the air passage 10. The evaporator 11 is arranged immediately downstream of the air passage 10 so as to cross the entire area in the case 1. The evaporator 11 is a heat exchanger that cools the air by absorbing the latent heat of the refrigerant flowing through the refrigeration cycle.

The evaporator 11 has the heat exchange core portion 110 and a header tank. For example, the heat exchange core portion 110 has refrigerant pipes and outer fins arranged at intervals from each other. The header tank is connected to ends of the refrigerant pipes of the heat exchange core portion 110. The evaporator 11 further includes the pipe connection portion 113. The pipe connection portion 113 is coupled with the inflow pipe 114 in which the refrigerant as a heat medium flows into the evaporator 11, and the outflow pipe 115 in which the refrigerant flows out of the evaporator 11. The pipe connection portion 113 is a pipe joint to which piping can be connected from outside the case 1. An expansion valve (not shown) may be connected to the pipe connection portion 113. Further, the pipe connection portion 113 may be configured as a component integrally formed with the expansion valve.

The header tank is provided at each end of the heat exchange core portion 110 in the flow direction of refrigerant. The inflow pipe 114 is located at one end of the evaporator 11 and is connected to an inflow side header tank corresponding to a refrigerant inflow portion in the evaporator 11. The outflow pipe 115 is located at the one end of the evaporator 11 adjacent to the inflow side header tank, and is connected to the outflow side header tank corresponding to a refrigerant outflow portion in the evaporator 11. The inflow side header tank and the outflow side header tank correspond to the upper tank 112 of the evaporator 11. The evaporator 11 includes the lower tank 111 at a lower portion opposite to the upper tank 112. The lower tank 111 is a tank portion at which the refrigerant is returned toward the outflow side header tank after flowing through the heat exchange core portion 110. An insulator may be provided between each header tank and the wall portion of the case 1 to prevent leakage of air.

The air flows from the blower through the heat exchange core portion 110. The evaporator 11 has an air passage surface 110a corresponding to an inlet surface or an outlet surface when the air passes through the heat exchange core portion 110. The air passage surface 110a has a rectangular flat plate shape, and the air passes in the thickness direction of the rectangular flat plate shape. The heat exchange core portion 110 spreads in the direction orthogonal to the flow direction of air. The air passage surface 110a is a virtual surface, and the air that exchanges heat with the heat medium flows perpendicularly to the air passage surface 110a when passing through the heat exchange core portion 110. The air passage surface 110a has irregularities formed by the refrigerant pipes and the outer fins at the end. The air passage surface 110a is not a flat surface formed at the end of the heat exchange core portion 110 in the flow direction of air. The heat exchange core portion 110 is arranged in an inclined posture with respect to the vertical direction. Further, the evaporator 11 is installed inside the case 1 in an inclined posture so that the upper end of the heat exchange core portion 110 is located on the front side of the vehicle than the lower end of the heat exchange core portion 110 is.

The heater core 14 is installed downstream of the evaporator 11 in the air flow or on the rear side of the vehicle. The heater core 14 is a heat exchanger that reheats the cold air that has passed through the evaporator 11. High-temperature engine cooling water flows inside the heater core 14 to heat the air using the cooling water as a heat source.

A cold air passage 12 is provided inside the case 1 and located on the rear side of the evaporator 11. The cold air flows through the cold air passage 12, after being cooled in the heat exchange core portion 110 of the evaporator 11, toward the cabin. A warm air passage 15 is provided within an area from the rear side to the upper side of the heater core 14 in the case 1, and air flows through the warm air passage 15 toward the cabin. After flowing through the cold air passage 12, the air is heated by the heater core 14 and flows through the warm air passage 15.

An air mix door 13 is disposed between the evaporator 11 and the heater core 14 to open and close the passage. The air mix door 13 adjusts the volume ratio between the air passing through the heater core 14 and the air not passing through the heater core 14. The air mix door 13 includes a plate-shaped body that rotates about a rotation axis, and adjusts the degree of opening of the passage according to the rotational position of the body. The air mix door 13 can be, for example, a butterfly type door or a cantilever door. The air mix door 13 may be configured by, for example, a slide type door for adjusting the degree of opening of the passage by moving the body in parallel by engaging with a rack and a pinion provided on the body.

An air mix section 16 is provided downstream of the cold air passage 12 and the warm air passage 15 to mix the cold air from the cold air passage 12 and the warm air from the heater core 14. The air mix section 16 is an area having a predetermined range to communicate with both the downstream side of the cold air passage 12 and the downstream side of the warm air passage 15. The conditioned air whose temperature is controlled in the air mix section 16 is blown out to a predetermined place in the cabin through a defroster passage, a face passage, a foot passage, and the like.

A defroster passage that communicates with the air mix section 16 extends upward in the upper and front portion of the case 1. The defroster passage communicates with the defroster outlet that opens to the cabin via the defroster duct. The defroster outlet opens toward the inner surface of the front windshield. A face passage that communicates with the air mix section 16 is provided in the upper part of the case 1 adjacent to the rear side of the defroster passage. The face passage communicates with the face outlet that opens to the cabin via the face duct. The face outlet blows out the conditioned air toward the upper body of the occupant.

The defroster passage and the face passage can be opened and closed by the air outlet switching door 17. The air outlet switching door 17 is similar to the air mix door 13, and controls both the defroster passage and the face passage to open or controls one to open and the other to be closed, depending on the rotational position.

A foot passage communicating with the air mix section 16 is provided in the rear portion of the case 1. The foot passage communicates with the foot outlet that opens to the cabin via the foot duct. The foot outlet blows out the conditioned air toward the lower body of the occupant. The foot passage can be opened and closed by the air outlet switching door. Further, the upstream passage connected to the defroster passage and the face passage can be opened and closed by the air outlet switching door 17.

According to the first embodiment, the air conditioner 100 includes the case 1 in which the air passage is defined, and the heat exchanger having the heat exchange core portion 110 installed so as to cross the air passage. The air conditioner 100 includes the support portion 18 provided in the case 1 to support the lower portion of the heat exchanger, and the cushioning material 20 interposed between the lower portion of the heat exchanger and the support portion 18. The support portion 18 includes the pipe side support 18a that supports the pipe side 111a of the lower portion of the heat exchanger located adjacent to the inflow pipe or the outflow pipe for the heat medium. The support portion 18 includes the opposite-to-pipe side support 18b that supports the opposite-to-pipe side 111b of the lower portion of the heat exchanger. The surface area of the opposite-to-pipe side support 18b in contact with the cushioning material 20 is larger than that of the pipe side support 18a.

According to the air conditioner 100, the surface area of the opposite-to-pipe side support 18b in contact with the cushioning material 20 is larger than the surface area of the pipe side support 18a in contact with the cushioning material 20. Therefore, the support pressure given to the cushioning material 20 by the opposite-to-pipe side support 18b can be smaller than the support pressure given to the cushioning material 20 by the pipe side support 18a. As a result, the amount of deformation of the cushioning material 20 on the opposite-to-pipe side can be made smaller than that of the cushioning material 20 on the pipe side. Therefore, the cushioning material 20 on the opposite-to-pipe side is more easily elastically deformed and can exhibit the ability to absorb the vibration of the heat exchanger. When the heat exchanger is pulled by the pipe and tilts toward the pipe, the cushioning material 20 is restricted from being deformed on the opposite-to-pipe side than the cushioning material 20 on the pipe side. Thus, the vibration of the heat exchanger can be restricted from transmitting from the opposite-to-pipe side 111b to the case 1. Accordingly, it is possible to provide the air conditioner 100 capable of reducing the vibration transmitted from the heat exchanger to the case 1. According to the air conditioner 100, noise caused by the vibration of the case 1 can be suppressed.

The pipe side support 18a has the pipe side rib protruding from the case 1. The opposite-to-pipe side support 18b is integrally provided with the opposite-to-pipe side rib 18b1 protruding from the case 1, and has the support surface in contact with the cushioning material 20. The opposite-to-pipe side support 18b intersects the opposite-to-pipe side rib 18b1.

Accordingly, the opposite-to-pipe side support 18b functions as a support pressure suppressing portion having the support surface intersecting with the opposite-to-pipe side rib 18b1. Therefore, the support pressure on the cushioning material 20 can be suppressed as compared with the pipe side support 18a adjacent to the pipe. Further, the opposite-to-pipe side support 18b can be bent with the opposite-to-pipe side rib 18b1 as a base point in a state of being in contact with the cushioning material 20. In other words, the opposite-to-pipe side support 18b swings with respect to the vibration of the heat exchanger to damp the vibration propagating to the case 1.

The support pressure suppressing portion has a plate shape projected from the end of the opposite-to-pipe side rib 18b1 to both sides so as to intersect the opposite-to-pipe side rib 18b1. Accordingly, both end portions of the support pressure suppressing portion can be bent like a balance with the tip end of the opposite-to-pipe side rib 18b1 as a fulcrum in a state of being in contact with the cushioning material 20. Therefore, the support pressure suppressing portion can swing with respect to the vibration of the heat exchanger. As a result, the support pressure suppressing portion can bend to either side of the opposite-to-pipe side rib 18b1. Thus, it is possible to enhance the effect of damping the vibrations propagating to the case 1 within a wide range.

The support surface of the support pressure suppressing portion has a surface area larger than the contact area of the cushioning material 20 in contact with the support surface. Accordingly, the support pressure suppressing portion can exert the effect of absorbing vibration relative to the entire surface of the cushioning material 20.

The plural pipe side supports 18a are provided side by side at intervals along the side surface of the heat exchanger adjacent to the pipe. The plural opposite-to-pipe side supports 18b are provided side by side at intervals along the side surface of the heat exchanger on the opposite-to-pipe side. Accordingly, the cushioning material 20 can be restricted from being deformed more on the opposite-to-pipe side than the cushioning material 20 on the pipe side in a wide range of the opposite-to-pipe side 111b of the heat exchanger.

The pipe side support 18a and the opposite-to-pipe side support 18b are provided at positions offset from each other with respect to the arrangement direction of the opposite-to-pipe side supports 18b.

Accordingly, the opposite-to-pipe side support 18b that supports the opposite-to-pipe side is provided not to overlap the pipe side support 18a on the pipe side. Vibration propagation from the heat exchanger to the case 1 can be suppressed by the cushioning material 20 not supported by the case 1 at such a position on the opposite-to-pipe side. Further, the opposite-to-pipe side support 18b is provided not to oppose the pipe side support 18a on the pipe side. Vibration propagation from the heat exchanger to the case 1 can be decreased by the vibration absorption effect of the cushioning material 20 supported by the opposite-to-pipe side support 18b at such a position on the opposite-to-pipe side. Therefore, the case 1 can effectively hold the heat exchanger and suppress the vibration propagation from the lower portion of the heat exchanger.

Second Embodiment

In the second embodiment, an opposite-to-pipe side support 118b will be described with reference to FIG. 6, which is modified relative to the first embodiment. The second embodiment has the same configuration as the first embodiment except for the opposite-to-pipe side support 118b.

In the second embodiment, components provided with the same reference signs as those in the drawings of the first embodiment and structures which are not described are similar to those of the first embodiment and have similar workings and effects. In the second embodiment, a configuration and the like different from those in the first embodiment will be described.

Figure 6:
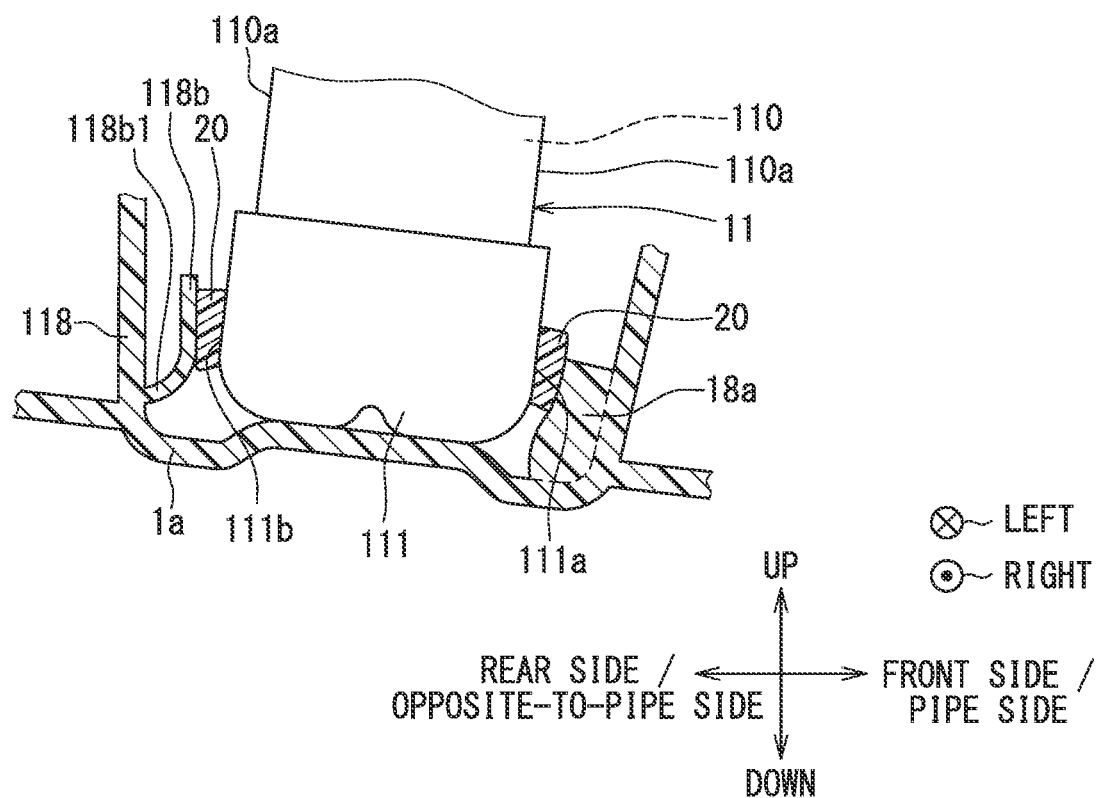
FIG. 6 is a cross-sectional view showing a part of a case that supports a lower tank of an evaporator according to a second embodiment.

As shown in FIG. 6, the opposite-to-pipe side support 118b has a plate-shaped portion protruding from the case 1. The base portion 118b1 is integrated with the case 1, and the opposite-to-pipe side support 118b has a free end which is the tip end of the plate-shaped portion. The opposite-to-pipe side support 118b has a flat surface facing the side surface of the lower tank 111 on the opposite-to-pipe side. The flat surface of the opposite-to-pipe side support 118b is a support surface extending toward the tip end along the side surface of the lower tank 111 on the opposite-to-pipe side.

When an external force acts on the support surface of the opposite-to-pipe side support 118b, the opposite-to-pipe side support 118b bends by being in contact with the cushioning material 20 within a predetermined range between the tip portion and the base portion 118b1. When an external force acts intermittently on the opposite-to-pipe side support 118b due to the vibration of the evaporator 11, the opposite-to-pipe side support 118b can move in small steps in a bent state with the base portion 118b1 as a fulcrum. The opposite-to-pipe side support 118b has elasticity to be deformed by an external force.

Further, the opposite-to-pipe side support 118b is provided at the same positions as the opposite-to-pipe side support 18b shown in FIG. 3 in the case 1.

According to the second embodiment, the pipe side support 18a is a pipe side rib protruding from the case 1. The opposite-to-pipe side support 118b is a support pressure suppressing portion having a plate-shape projected from the case 1 and extended along the opposite-to-pipe side 111b. The support pressure suppressing portion has a support surface that contacts the cushioning material 20.

Accordingly, the opposite-to-pipe side support 118b can be bent with a root portion of the opposite-to-pipe side support 118b as a base point. Therefore, the support pressure on the cushioning material 20 can be suppressed as compared with the pipe side support 18a which is the pipe side rib. As a result, it is possible to attenuate the vibration propagating from the opposite-to-pipe side 111b to the case 1 by the bending with respect to the vibration of the heat exchanger.

Other Embodiments

The disclosure in the present specification is not limited to the embodiments. The disclosure encompasses the illustrated embodiments and variations thereof by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure encompasses the omission of parts and elements of the embodiments. The disclosure encompasses the replacement or combination of components, elements between one embodiment and another. The disclosed technical scope is not limited to the description of the embodiment. Technical scopes disclosed are indicated by descriptions in the claims and should be understood to include all modifications within the meaning and scope equivalent to the descriptions in the claims.

In the air conditioner 100, the heat exchanger supported by the support portion of the case 1 is not limited to the evaporator 11. The case 1 is capable of supporting other heat exchangers having a pipe extended to the outside of the case 1, such as a condenser for heating and a heater core through which hot water flows.

In the embodiment, the case 1 is constructed by the first case member 1a and the second case member 1b, but the number and configuration are not limited to these.

In the air conditioner 100, the opposite-to-pipe side support 18b and the pipe side support 18a may be provided at positions facing each other in the flow direction of air.

What is claimed is:
1. An air conditioner for a vehicle comprising:
a case having an air passage through which air flows into a cabin;
a heat exchanger having a core portion in which heat is exchanged between the air and a heat medium flowing inside, the core portion being arranged so as to cross the air passage;
a support portion provided in the case to support a lower portion of the heat exchanger; and
a cushioning material interposed between the lower portion of the heat exchanger and the support portion, wherein
the lower portion of the heat exchanger has a pipe side adjacent to an inflow pipe or an outflow pipe for the heat medium and an opposite-to-pipe side located on an opposite side of the pipe side,
the support portion includes
a pipe side support that supports the pipe side, and
an opposite-to-pipe side support that supports the opposite-to-pipe side,
a surface area of the opposite-to-pipe side support of the support portion in contact with the cushioning material is larger than that of the pipe side support of the support portion,
the pipe side support comprises a pipe side rib protruding from the case,
the opposite-to-pipe side support is integrally provided with an opposite-to-pipe side rib protruding from the case, and has a support surface in contact with the cushioning material,
the opposite-to-pipe side support has a plate shape that protrudes from an end of the opposite-to-pipe side rib to both sides so as to intersect the opposite-to-pipe side rib,
the pipe side support is one of a plurality of pipe side supports arranged at an interval along a side surface of the lower portion of the heat exchanger adjacent to the inflow pipe or the outflow pipe, and
the opposite-to-pipe side support is one of a plurality of opposite-to-pipe side supports arranged at an interval along a side surface of the lower portion of the heat exchanger adjacent to the opposite-to-pipe side.

2. The air conditioner according to claim 1, wherein the opposite-to-pipe side support has a surface area larger than a contact area of the support surface in contact with the cushioning material.

3. An air conditioner for a vehicle comprising:
a case having an air passage through which air flows into a cabin;
a heat exchanger having a core portion in which heat is exchanged between the air and a heat medium flowing inside, the core portion being arranged so as to cross the air passage;
a support portion provided in the case to support a lower portion of the heat exchanger; and a cushioning material interposed between the lower portion of the heat exchanger and the support portion, wherein the lower portion of the heat exchanger has a pipe side adjacent to an inflow pipe or an outflow pipe for the heat medium and an opposite-to-pipe side located on an opposite side of the pipe side, the support portion includes a pipe side support that supports the pipe side, and an opposite-to-pipe side support that supports the opposite-to-pipe side, a surface area of the opposite-to-pipe side support of the support portion in contact with the cushioning material is larger than that of the pipe side support of the support portion, the pipe side support comprises a pipe side rib protruding from the case, the opposite-to-pipe side support is integrally provided with an opposite-to-pipe side rib protruding from the case, and has a support surface in contact with the cushioning material and intersecting the opposite-to-pipe side rib, the opposite-to-pipe side support has a surface area larger than a contact area of the support surface in contact with the cushioning material, the pipe side support is one of a plurality of pipe side supports arranged at an interval along a side surface of the lower portion of the heat exchanger adjacent to the inflow pipe or the outflow pipe, and the opposite-to-pipe side support is one of a plurality of opposite-to-pipe side supports arranged at an interval along a side surface of the lower portion of the heat exchanger adjacent to the opposite-to-pipe side.

4. The air conditioner according to claim 3, wherein the pipe side support and the opposite-to-pipe side support are located offset from each other with respect to an arrangement direction of the opposite-to-pipe side supports.

* * * * *